United States Patent
Kim

(10) Patent No.: US 9,852,067 B2
(45) Date of Patent: Dec. 26, 2017

(54) DATA STORAGE DEVICE AND OPERATING METHOD THEREOF

(71) Applicant: Sk hynix Inc., Gyeonggi-do (KR)

(72) Inventor: Min Chul Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/048,700

(22) Filed: Feb. 19, 2016

(65) Prior Publication Data

US 2017/0123973 A1    May 4, 2017

(30) Foreign Application Priority Data

Nov. 4, 2015 (KR) .................. 10-2015-0154298

(51) Int. Cl.
*G06F 12/00* (2006.01)
*G06F 12/02* (2006.01)

(52) U.S. Cl.
CPC ...... *G06F 12/0253* (2013.01); *G06F 12/0246* (2013.01); *G06F 2212/1036* (2013.01); *G06F 2212/7205* (2013.01)

(58) Field of Classification Search
None
See application file for complete search history.

(56) References Cited

U.S. PATENT DOCUMENTS

2013/0067136 A1 * 3/2013 Bates .................. G06F 12/00
                                                         711/103
2015/0143026 A1   5/2015 Reddy et al.

FOREIGN PATENT DOCUMENTS

KR      1020080071366      8/2008

* cited by examiner

*Primary Examiner* — Baboucarr Faal
(74) *Attorney, Agent, or Firm* — IP & T Group LLP

(57) ABSTRACT

A data storage device includes a nonvolatile memory device including a plurality of memory units; and a controller suitable for acquiring a temperature information for a current temperature, and for selectively adding a position information of a memory unit to a management list according to the temperature information.

14 Claims, 10 Drawing Sheets

DATA STORAGE DEVICE AND OPERATING METHOD THEREOF

CROSS-REFERENCES TO RELATED APPLICATION

The present application claims priority under 35 U.S.C. §119(a) to Korean application number 10-2015-0154298, filed on Nov. 4, 2015, with the Korean Intellectual Property Office, the disclosure of which is incorporated herein by reference in its entirety.

BACKGROUND

1. Technical Field

Various embodiments generally relate to a data storage device and an operating method thereof and more particularly, to a data storage device for improving data reliability and an operating method thereof.

2. Related Art

Data storage devices store data provided by an external device in response to a write request. Data storage devices may also provide stored data to an external device in response to a read request. Examples of external devices that use data storage devices include computers, digital cameras, cellular phones and the like. Data storage devices can be embedded in external devices or fabricated separately and then connected afterwards.

SUMMARY

In an embodiment, a data storage device may include: a nonvolatile memory device including a plurality of memory units; and a controller suitable for acquiring a temperature information for a current temperature, and for selectively adding a position information of a memory unit to a management list according to the temperature information.

In an embodiment, a method for operating a data storage device may include: storing data in a memory unit; acquiring a temperature information for a current temperature; and selectively adding a position information of the memory unit, to a management list, according to the temperature information.

In an embodiment, a data storage device may include: a nonvolatile memory device; and a controller suitable for reclaiming data stored in the nonvolatile memory device, according to a change in an operating condition.

DETAILED DESCRIPTION

Figure 1:
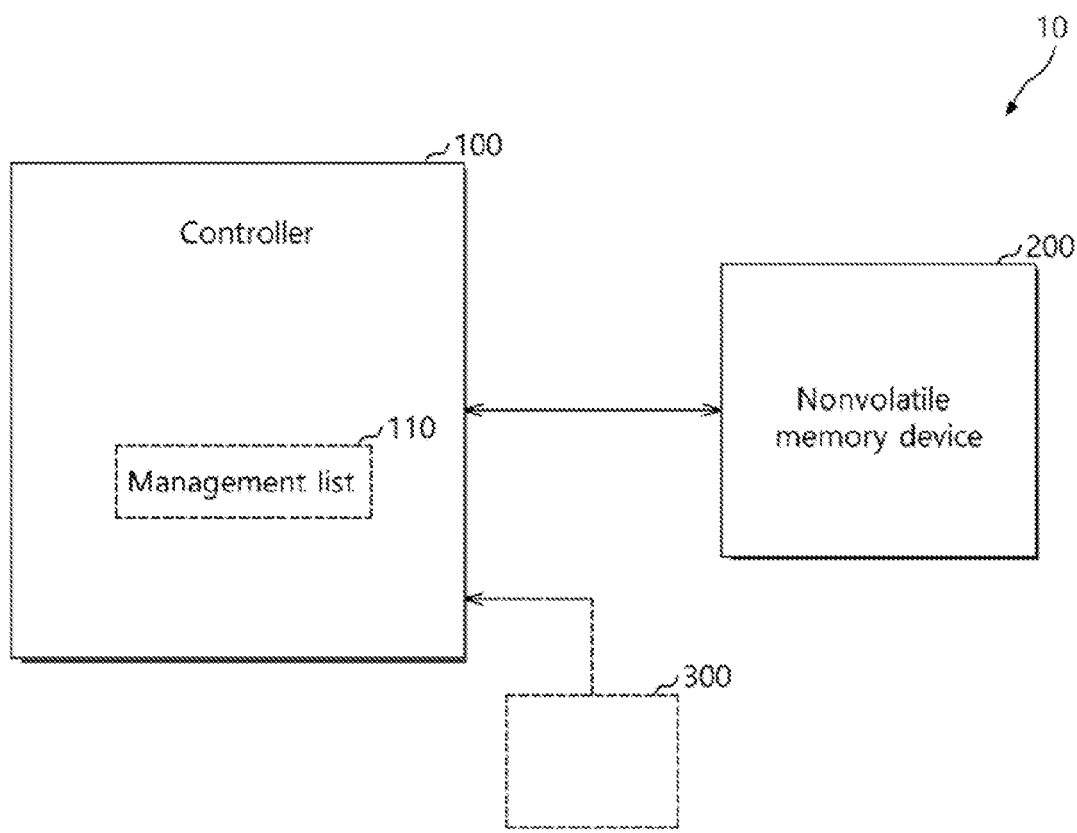
FIG. 1 is a block diagram illustrating a data storage device including a controller and a nonvolatile memory device, according to an embodiment of the present invention.

Hereinafter, various embodiments of the present invention, including a data storage device and an operating method thereof, will be described with reference to the accompanying drawings. The present invention may, however, be embodied in different forms and should not be construed as being limited to the embodiments set forth herein. Rather, these embodiments are provided to describe the invention in sufficient detail so that a person skilled in the art to which the invention pertains may practice the technical concepts of the present invention.

It is to be understood that embodiments of the present invention are not limited to the particulars shown in the drawings, that the drawings are not necessarily to scale and in some instances, proportions may have been exaggerated in order to more clearly depict certain features of the invention. Moreover, while particular terminology is used, it is to be appreciated, that the terminology used is for describing particular embodiments only, and it is not intended to limit the scope of the present invention.

Referring now to FIG. 1, a data storage device 10 according to an embodiment of the present invention may be or include a Personal Computer Memory Card International Association (PCMCIA) card, a compact flash (CF) card, a smart media card, a memory stick, a multimedia card (MMC), an embedded MMC (eMMC), a reduced-size multimedia card (RS-MMC) and a micro-size version of MMC (MMC-micro), a secure digital (SD) card, a mini secure digital (mini-SD) and a micro secure digital (micro-SD), a universal flash storage (UFS), a solid state drive (SSD), and or the like.

The data storage device 10 may include a controller 100 and a nonvolatile memory device 200. The controller 100 may control the general operations of the data storage device 10. The controller 100 may store data in the nonvolatile memory device 200 in response to a write request transmitted from an external device. The controller 100 may read data stored in the nonvolatile memory device 200 to output the read data to an external device in response to a read request. The read request may be transmitted to the controller from an external device.

When a large difference exists between a temperature when data is stored in the nonvolatile memory device 200, (hereinafter referred to also as a write temperature) and a temperature when the data is read from the nonvolatile memory device 200 (hereinafter referred to also as a read temperature), a probability of an error bit occurring in read-out data may be high. For example, data stored in the nonvolatile memory device 200 at a high temperature may have a high probability of including an error bit, when it is read at a low temperature, and vice versa.

The controller 100 may improve data reliability, by controlling an operation of the data storage device 10 to reduce the temperature difference between a write temperature and a read temperature.

The controller 100 may reclaim data stored in the nonvolatile memory device 200, according to a change in an operating condition. For example, the controller 100 may reclaim data stored in the nonvolatile memory device 200 at a first operating condition, at a second operating condition. The first operating condition may be an abnormal temperature, whereas the second operating condition may be a normal temperature. The normal temperature may be, for example, an intermediate temperature, whereas the abnormal temperature may be, for example, a higher or a lower temperature than the intermediate temperature. The intermediate temperature may be a temperature ranging within a preset range of temperatures including a room temperature.

For example, for data that have been stored previously at o an abnormally high or low temperature, the controller 100 may store the data again, at a normal temperature using a reclaim operation. In this manner, the difference between a write temperature and a read temperature for the restored data may be reduced and thus decrease a read out error rate. For example, data initially stored at an abnormally high temperature may be restored at an intermediate temperature using a reclaim operation and then, the restored data may be read at a low temperature with a lower read-out error rate, because the difference between the write and read temperatures for the restored data is reduced.

The controller 100 may acquire information for a current temperature using a temperature sensing unit 300. A temperature sensing unit 300 may be included in the data storage device 10 or an external device. A temperature sensing unit may be included in the controller 100 or the nonvolatile memory device 200. One or more temperature sensing units may be employed. A current temperature may be a temperature of the data storage device as a whole. A current temperature may be a temperature of the nonvolatile memory device 200. In an embodiment, a plurality of temperature sensing units may be employed for sensing the current temperature of each memory block, or each memory unit such as a memory page of the nonvolatile memory device 200. The current temperature may be measured at the time when data is stored to a memory unit such as a memory page. As will be described later, the controller 100 may manage a management list 110 and perform the reclaim operation and a garbage collection operation, based on the temperature information.

First, when storing data in a memory unit of the nonvolatile memory device 200, the controller 100 may selectively add a position information of the memory unit to the management list 110 according to a temperature information. The controller 100 may add the position information to the management list 110 when it is determined based on the temperature information that a current temperature is an abnormal temperature. The management list 110 may include a plurality of position information corresponding to data stored at abnormal temperatures. The controller 100 may identify data stored at abnormal temperatures, by referring to the management list 110. A memory unit may be, for example, a page.

The controller 100 may add a position information corresponding to data stored in the nonvolatile memory device 200 at an abnormal temperature, to the management list 110, regardless of which operation the data is stored through. For example, the controller 100 may add position information corresponding to not only data stored in response to a request from the external device but also data stored using the reclaim operation and the garbage collection operation, to the management list 110.

The controller 100 may selectively reclaim data stored in a memory unit corresponding to a position information included in the management list 110, according to a temperature information. The controller 100 may reclaim data stored in a memory unit corresponding to a position information included in the management list 110, when it is determined based on a temperature information that a current temperature is a normal temperature. The controller 100 may perform the reclaim operation by immigrating data to be reclaimed, to a new memory unit.

According to an embodiment of the present invention the controller 100 may perform a reclaim operation, when no request is received from the external device, for example, at an idle time. The controller 100 may perform the reclaim operation by referring to the management list 110, when it is determined at an idle time that a current temperature is a normal temperature.

According to another embodiment of the present invention, the controller 100 may perform the reclaim operation through the garbage collection operation. In detail, the controller 100 may perform the garbage collection operation for a victim memory region selected according to a temperature information. The controller 100 may select a victim memory region based on position information included in the management list 110, when it is determined based on a temperature information that a current temperature is a normal temperature. In detail, the controller 100 may select a memory region which includes memory units corresponding to position information included in the management list 110, as a victim memory region. A victim memory region may be selected, example for, on a per memory block basis.

According to an embodiment, the management list 110 may be stored in the nonvolatile memory device 200. The controller 100 may load the management list 110 from the nonvolatile memory device 200 into an internal memory of the controller 100 and manage the loaded management list 110, for example, upon a power-on or in response to a specified command, if necessary. The controller 100 may store the management list 110 having been loaded into the internal memory, in the nonvolatile memory device 200, for example, periodically, upon a power-off or in response to a specified command.

The nonvolatile memory device 200 may include flash memory devices such as NAND flash or NOR flash, Ferroelectrics Random Access Memory (FeRAM), Phase-Change Random Access Memory (PCRAM), Magnetoresistive Random Access Memory (MRAM) or Resistive Random Access Memory (ReRAM), and or the like.

The nonvolatile memory device 200 may store data transmitted from the controller 100 and may read stored data to transmit read data to the controller 100, under the control of the controller 100.

Although FIG. 1 exemplarily illustrates that the data storage device 10 includes one nonvolatile memory device 200, it is to be noted that the number of nonvolatile memory devices included in the data storage device 10 is not specifically limited.

Figure 2:
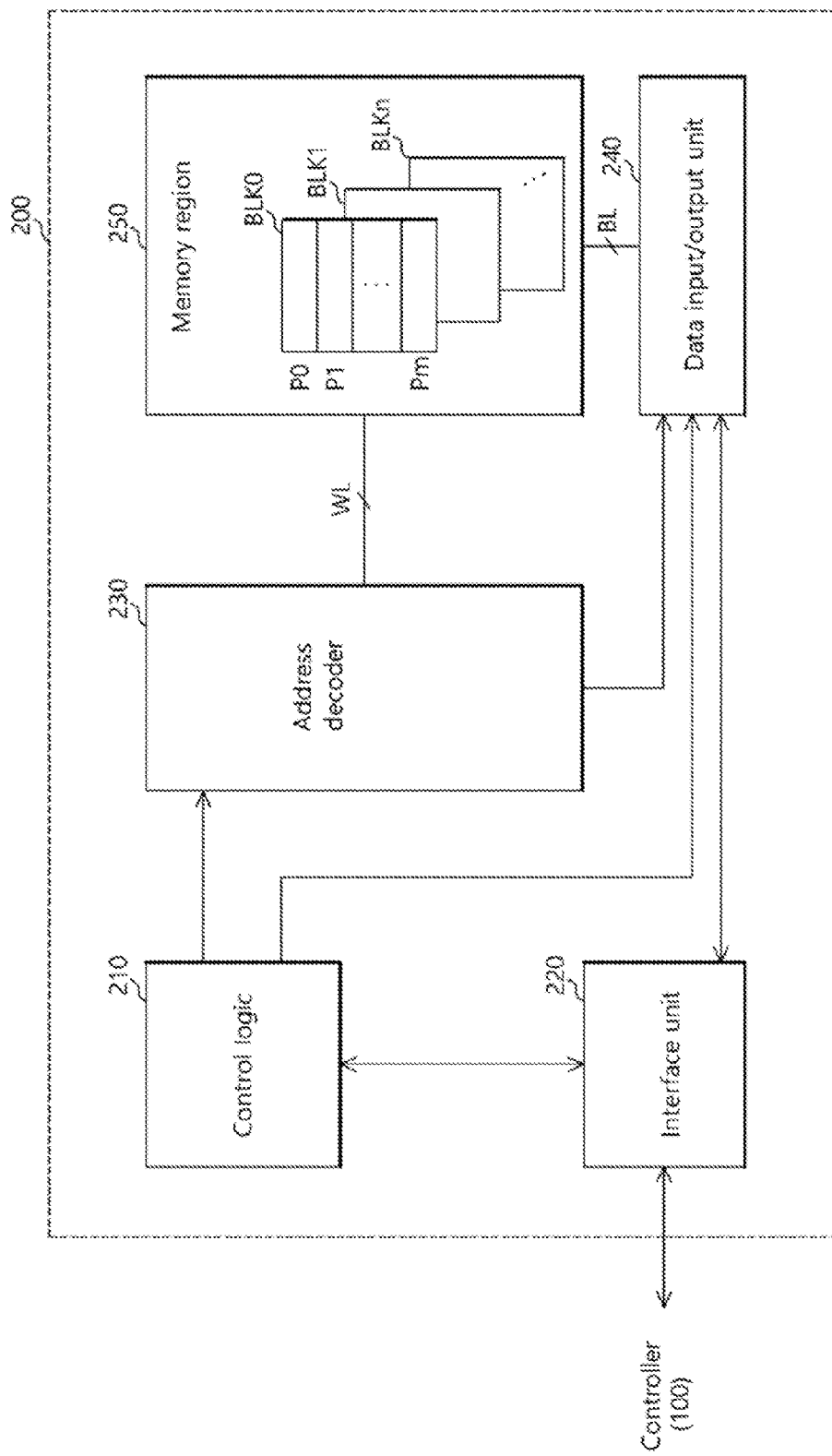
FIG. 2 is a block diagram illustrating an example of a detailed configuration of the nonvolatile memory device of FIG. 1, according to an embodiment of the present invention.

FIG. 2 is a block diagram illustrating a detailed configuration of the nonvolatile memory device 200 of FIG. 1, according to an embodiment of the present invention. The nonvolatile memory apparatus 200 may include a control logic 210, an interface unit 220, an address decoder 230, a data input/output unit 240 and a memory region 250.

The control logic 210 may control one or more general operations of the nonvolatile memory device 200 including write and read operations under the control of the controller 100.

The interface unit 220 may exchange data and various control signals including commands and addresses with the controller 100. The interface unit 220 may transmit data and various control signals received from the controller, to one or more internal units of the nonvolatile memory device 200.

The address decoder 230 may decode rove and column addresses transmitted thereto. The address decoder 230 may selectively drive one or more word lines WL, based on decoding results of the row addresses. The address decoder 230 may control the data input/output unit 240 so that bit lines BL may be selectively driven, based on decoding results of the column addresses.

The data input/output unit 240 may transmit data transmitted from the interface unit 220, to the memory region 250 via the bit lines BL. The data input/output unit 240 may transmit data read from the memory region 250 to the interface unit 220 via the bit lines BL.

The memory region 250 may be coupled with the address decoder 230 through a plurality of word lines WL. The memory region 250 may be coupled with the data input/output unit 240 through a plurality of bit lines BL. The memory region 250 may include a plurality of memory cells for storing data therein. The memory cells may be disposed at the intersections of the word lines WL and the bit lines BL.

The memory region 250 may include any suitable architecture. For example, the memory region 250 may include a plurality of memory blocks BLK0 to BLKn, each memory block including a plurality of memory cells. Each of the memory blocks BLK0 to BLKn may include a plurality of pages P0 to Pm. The memory region may be or include a 2-D or 3-D structure. The memory region may be or include an open bit line structure. The memory region may be or include a folded bit-line structure.

Figure 3:
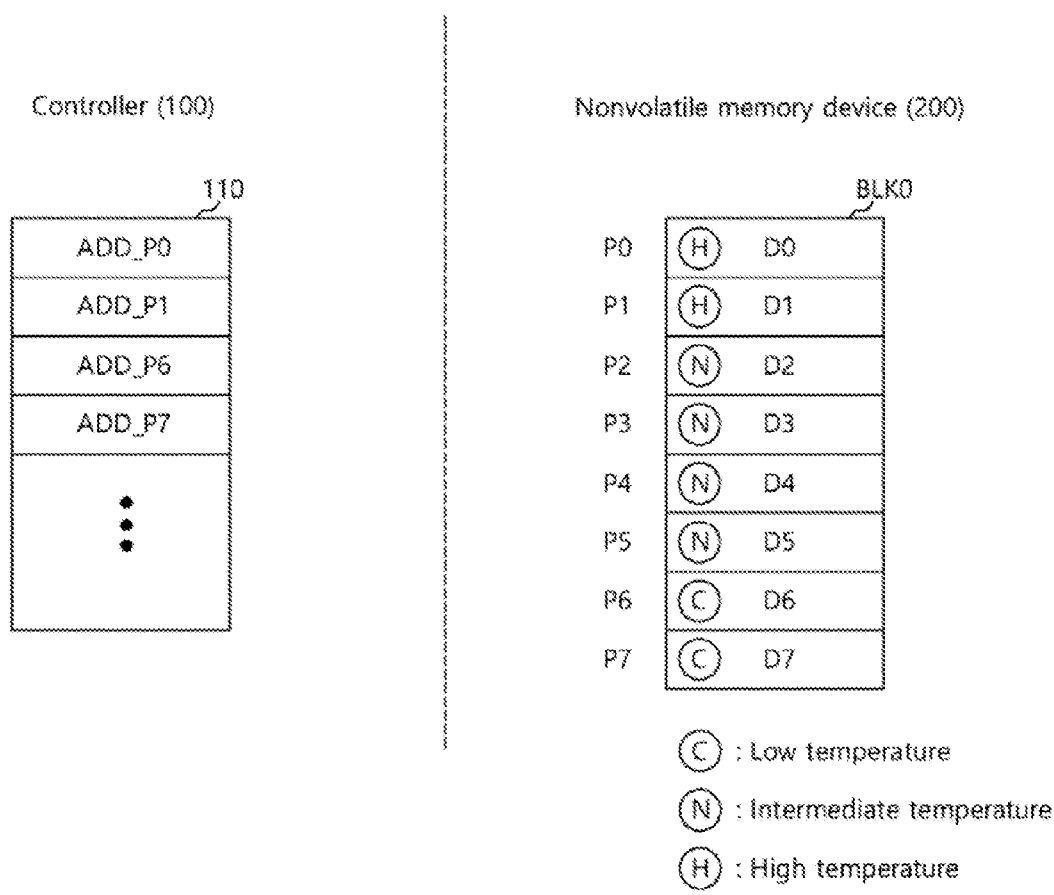
FIG. 3 is a diagram illustrating a method for adding position information for selected memory units of a nonvolatile memory device to a management list, according to an embodiment of the present invention.

FIG. 3 is a diagram illustrating a method for adding position information to the management list 110 when storing data in a memory block BLK0 of the nonvolatile memory device 200, according to an embodiment of the present invention. In the embodiment shown in FIG. 3, it is assumed that the memory block BLK0 may have, for example, 8 pages P0 to P7.

Accordingly, the controller 100 may selectively add the position information of a memory unit, such as a page, to the management list 110 depending upon the temperature information acquired when storing data in the memory unit. For example, the controller 100 may add the position information of a memory unit to the management list 110 when it is determined based on the acquired temperature information that a write temperature for the memory unit is an abnormal temperature, i.e. an abnormally high or abnormally low temperature falling outside a preset normal temperature range. The position information of a memory unit may be an address of the memory unit. For example, when the memory unit is a page the memory unit may be an address of the page.

Referring to FIG. 3, the controller 100 may store data in the respective pages P0 to P7 of the memory block BLK0. Data D0 and D1 may be stored in pages P0 and P1 at a high temperature, as indicated by the letter H. Data D2 to D5 may be stored in pages P2 to P5 at an intermediate temperature as indicated by the letter N. Data D6 and D7 may be stored in pages P6 and P7 at a low temperature as indicated by the letter L. The controller 100 may determine that the write temperatures when the data D0, D1, D6 and D7 are stored are abnormal temperatures, e.g. outside a preset normal temperature range. Hence, the controller 100 may then add to the management list 110 addresses ADD_P0, ADD_P6 and ADD_P7 of the pages P0, P1, P6 and P7 where the data D0, D1, D6 and D7 are stored, respectively. For the remaining pages P2, P3, P4 and P5, since they have intermediate normal write temperatures, their positions may not be added in the management list 110.

Figure 4:
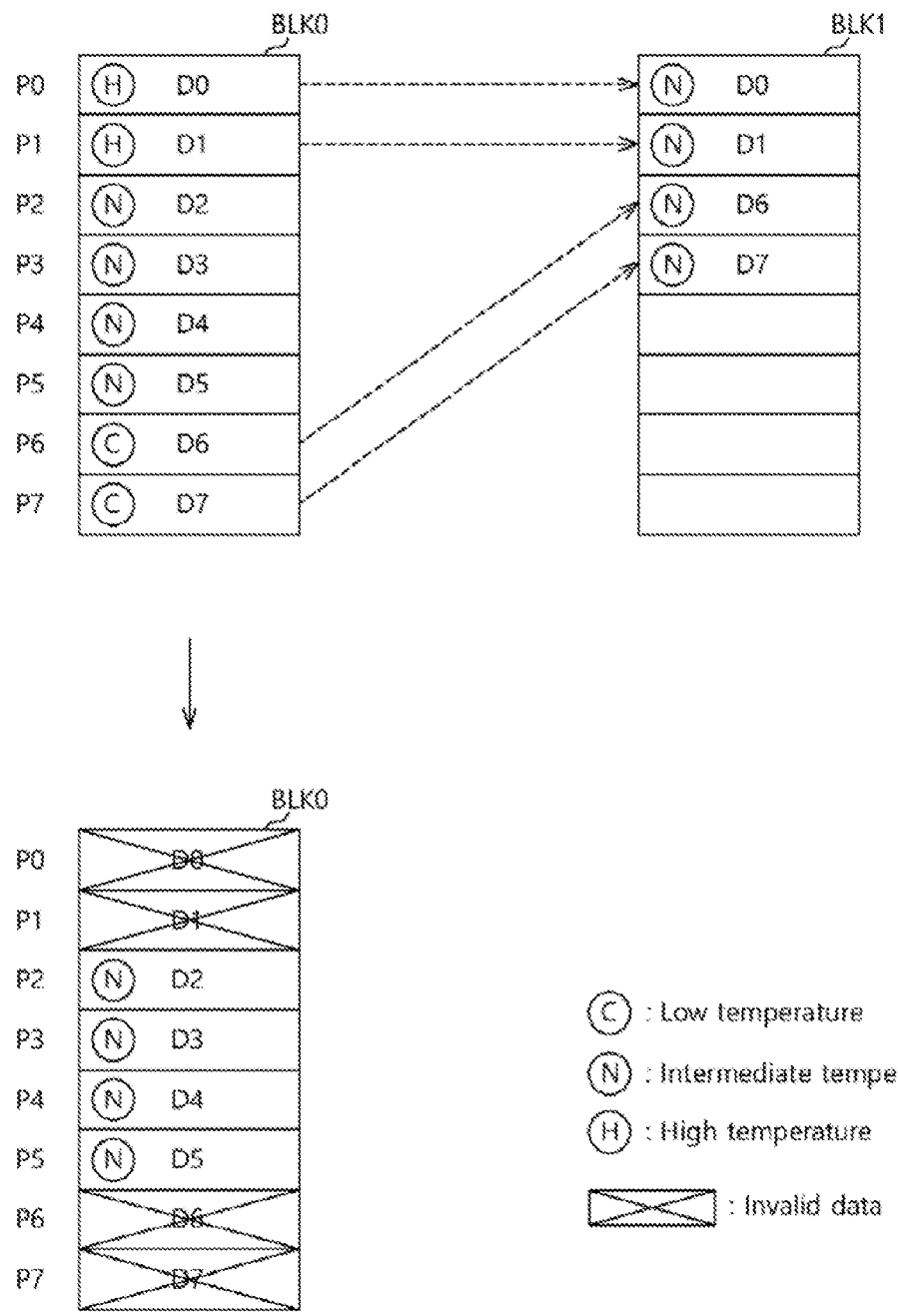
FIG. 4 is a diagram illustrating a method for reclaiming data stored in selected memory units of a nonvolatile memory device, according to an embodiment of the present invention.

Referring now to the diagram of FIG. 4, an example is provided of a method for the controller 100 of FIG. 1 for reclaiming data stored in a memory block BLK0, according to an embodiment of the present invention.

The controller 100 may reclaim data stored in pages corresponding to position information included in the management list 110, for example, data stored at abnormal temperatures when it is determined based on a temperature information that a current temperature is a normal temperature. The controller 100 may perform the reclaim operation by reading data from original pages, storing the read data in new pages and invalidating the data stored in the original pages. The controller 100 may then remove position information corresponding, to reclaimed data from the management list 110.

Referring to FIG. 4, the controller 100 may store again, i.e. re-store in the memory block BLK1, the data D0, D1, D6 and D7 previously stored in the memory block BLK0 at abnormal temperatures, by referring to the management list 110, when it is determined that a current temperature is a normal temperature. Further, the controller 100 may invalidate the data D0, D1, D6 and D7 stored in the original pages P0, P1, P6 and P7 of the memory block BLK0.

According to an embodiment of the present invention, the controller 100 may reclaim data initially stored at an abnormally high or low temperature, using empty pages of the same memory block. For example, the controller 100 may transfer data to be reclaimed, to empty pages of the same memory block.

Figure 5:
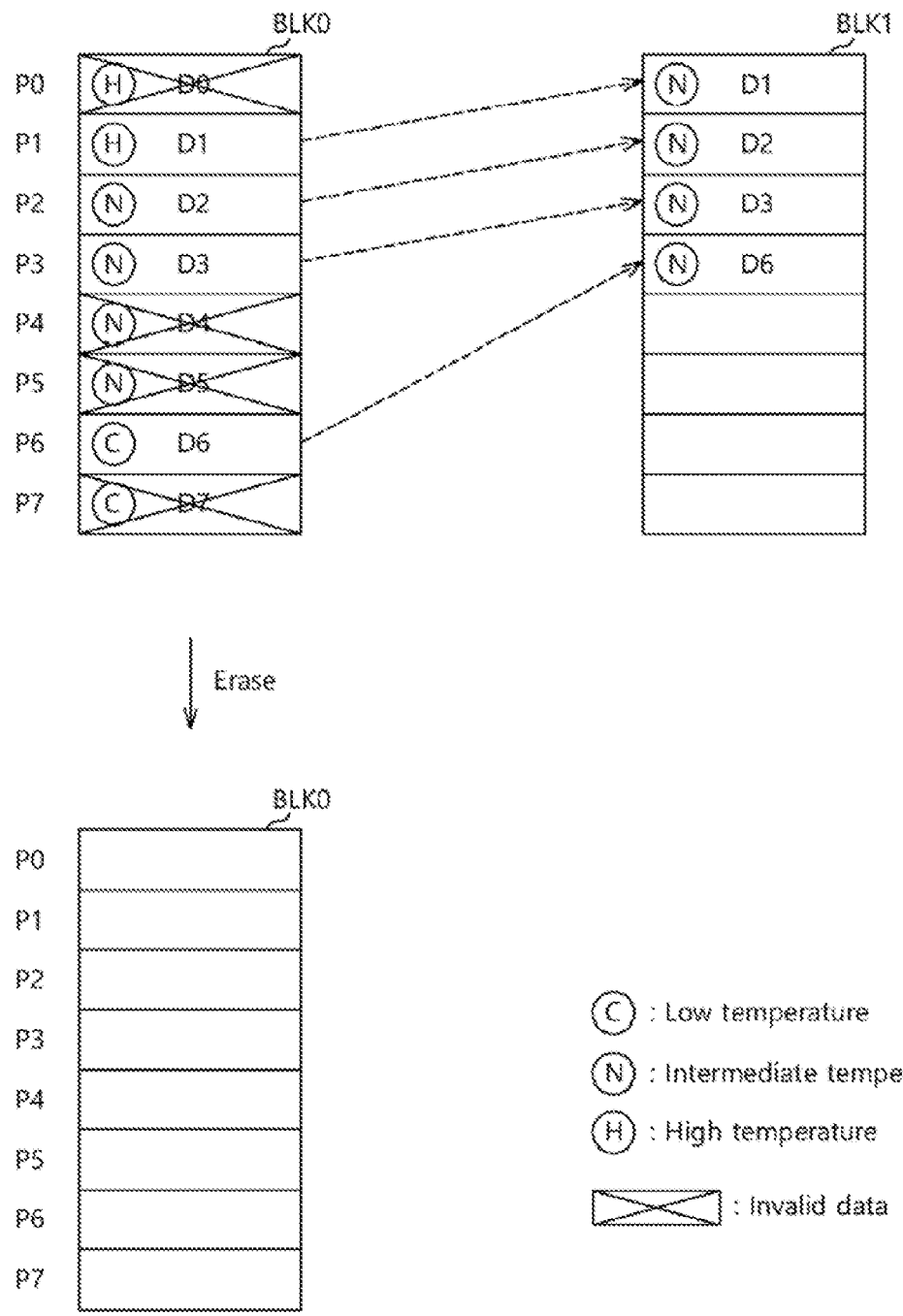
FIGS. 5 and 6 are diagrams illustrating a method for performing garbage collection operations for selected memory units of a nonvolatile memory, according to an embodiment of the present invention.
Figure 6:
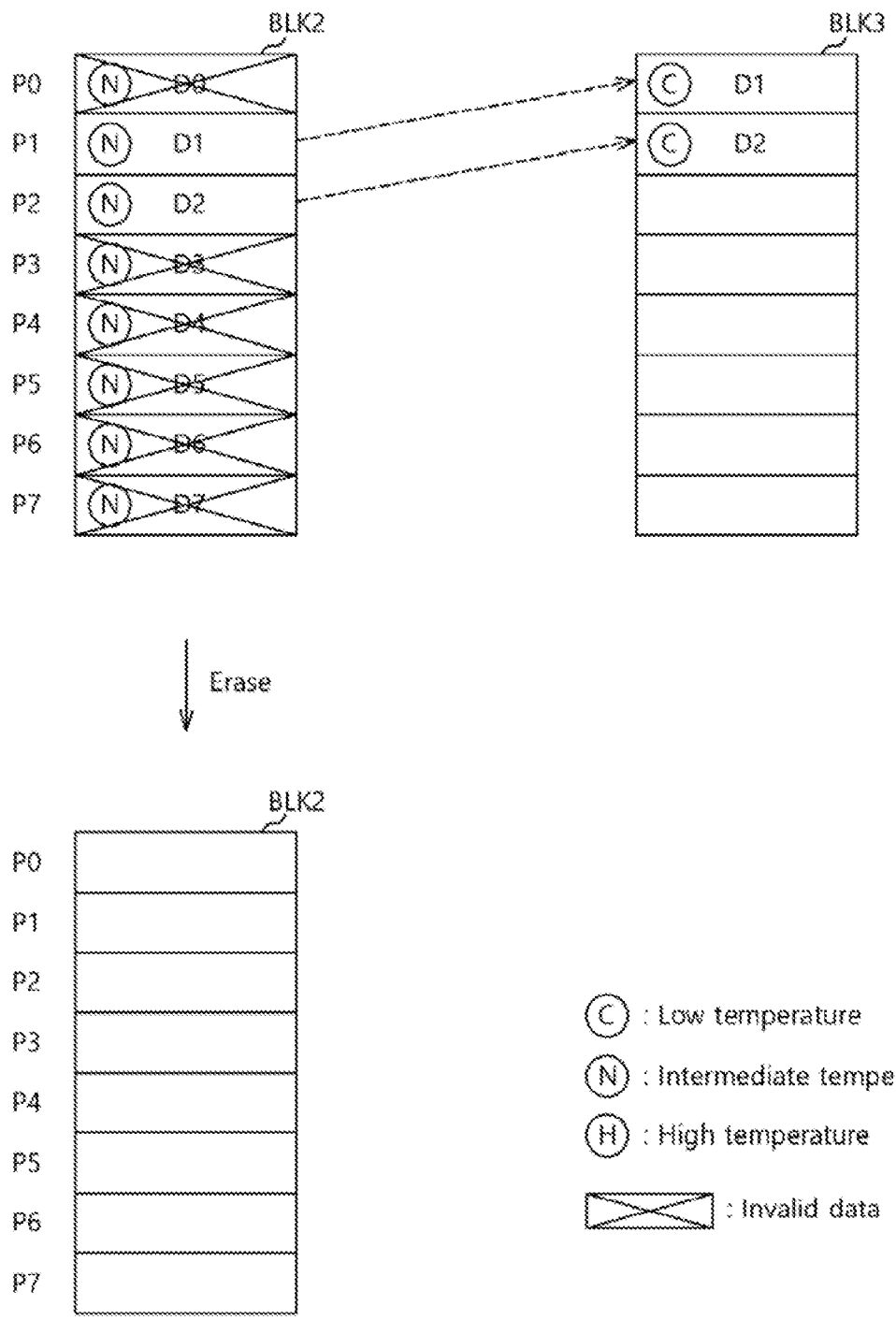

FIGS. 5 and 6 are diagrams of examples of methods for the controller 100 of FIG. 1 to perform garbage collection operations, according to an embodiment of the present invention. FIG. 5 shows a garbage collection operation performed at a normal temperature, according to an embodiment of the present invention. FIG. 6 shows a garbage collection operation performed at an abnormal temperature, according to an embodiment of the present invention.

The controller 100 may select a victim memory block based on a temperature information, when performing the garbage collection operation. The controller 100 may select a memory block including pages corresponding to position information included in the management list 110, as a victim memory block, when it is determined that a current temperature is a normal temperature. In other words, the controller 100 may select a memory block having one or more data are stored at abnormal temperatures, as a victim memory block, when it is determined that a current temperature for the selected memory block is a normal temperature. Hence, the controller 100 may then reclaim data previously stored at an abnormal temperature, as data under a normal temperature through a garbage collection operation to re-store the reclaimed data, thereby, reducing a difference between a write temperature and a read temperature for the restored data.

Meanwhile, the controller 100 may select a memory block not including a page corresponding to a position information included in the management list 110, as a victim memory block, when it is determined that a current temperature is an abnormal temperature. For example, the controller 100 may select a memory block having data stored at only normal temperatures, as a victim memory block, when it is determined that a current temperature is an abnormal temperature. In this case, even when the controller 100 inevitably performs a garbage collection operation at an abnormal temperature, it is possible to prevent occurrence of an error bit caused due to the fact that valid data stored at a past abnormal temperature, for example, a high temperature, is read at the current abnormal temperature, for example, a low temperature, for transferring the data according to the garbage collection operation.

The controller 100 may add to the management list 110 position information of pages to which valid data are transferred from a victim memory black through the garbage collection operation, when it is determined that a current temperature is an abnormal temperature.

According to an embodiment of the present invention, the controller 100 may select a victim memory block according to a preset garbage collection policy. For example, the controller 100 may select a victim memory block in consideration of the management list 110, the number of valid pages, an expected processing cost and/or a wear leveling of a memory block.

Referring to FIG. 5, the controller 100 may determine that a current temperature is a normal temperature. The controller 100 may select the memory block BLK0 having one or more data are stored at abnormal temperatures, as a victim memory block, by referring to the management list 110. The controller 100 may read valid data D1, D2, D3 and D6 stored in the victim memory block BLK0, to re-store the read data in the memory block BLK1, and may erase the victim memory block BLK0. The controller 100 may remove, from the management list 110, position information corresponding to the data D1 and D6 which are stored in the victim memory block BLK0 at abnormal temperatures.

Referring to FIG. 6, the controller 100 may determine that a current temperature, for example, a low temperature, is an abnormal temperature. The controller 100 may select the memory block BLK2 having data stored at only normal temperatures, as a victim memory block. The controller 100 may read valid data D1 and D2 stored in the victim memory block BLK2, to re-store the read data in the memory block BLK3, and may erase the victim memory block BLK2. Further, the controller 100 may add, to the management list 110, position information of pages having the valid data D1 and D2 are stored in the memory block BLK3.

Figure 7:
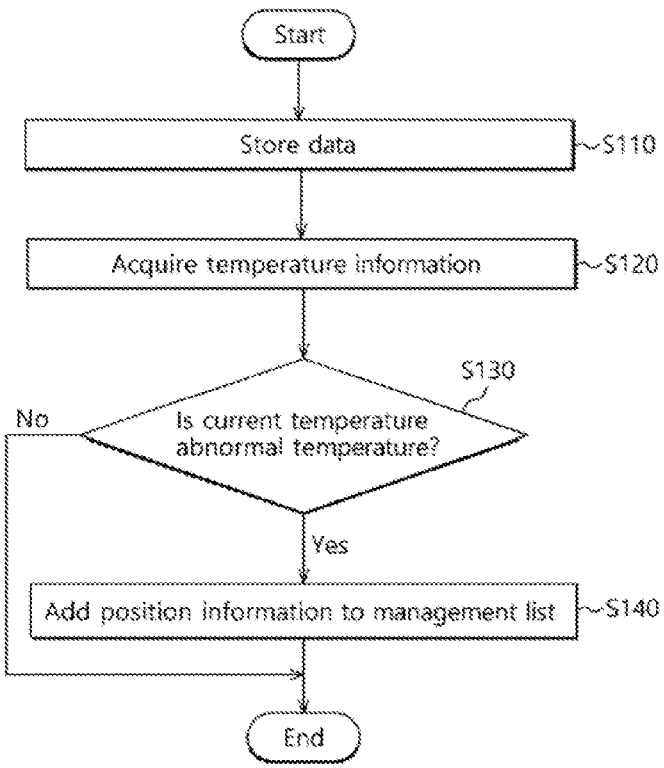
FIG. 7 is a flow chart of a method of operation of the data storage device of FIG. 1, according to an embodiment of the present invention.

FIG. 7 is a flow chart of a method of the data storage device 10 of FIG. 1, according to an embodiment of the invention. Accordingly at step S110, the controller 100 may store data in a memory unit of the nonvolatile memory device 200. The memory unit may be, for example, a page.

At step S120, the controller 100 may acquire a temperature information for a current temperature. The controller 100 may acquire the temperature information from a temperature sensing unit 300 included in the data storage device 10 or an external device. The temperature sensing unit 300 may provide a current temperature for the whole nonvolatile memory device. In an embodiment the temperature sensing unit may provide a current temperature for each memory block.

At step S130, the controller 100 may determine whether or not a current temperature is an abnormal temperature. In the case where the current temperature is an abnormal temperature (Yes), the process may proceed to step S140. In the case where the current temperature is a normal temperature (No), the process may be ended.

At step S140, the controller 100 may add a position information of the memory unit to the management list 110. A position information may be an address of a memory unit. The controller 100 may then identify data stored at abnormal temperatures, by referring to the management list 110.

Figure 8:
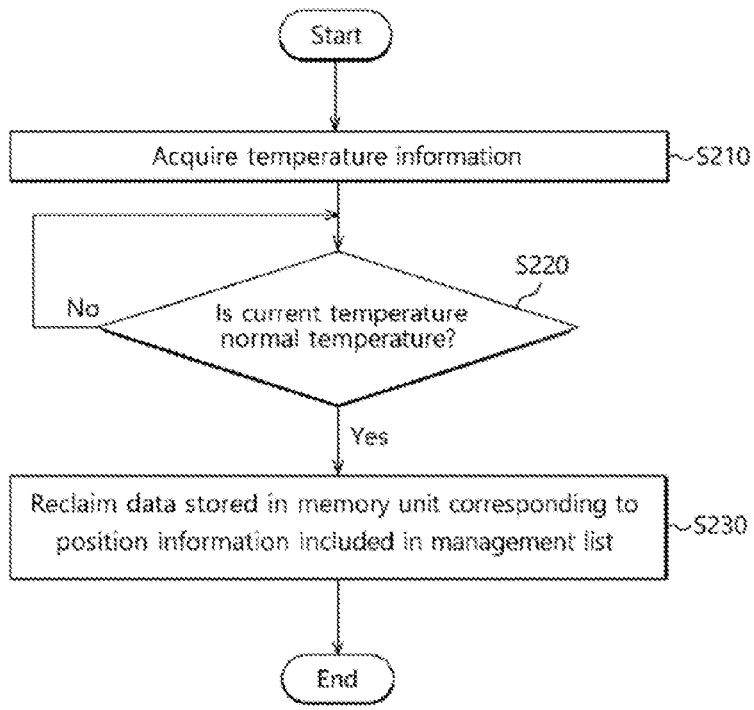
FIG. 8 is a flow chart of a reclaim operation of the data storage device of FIG. 1, according to an embodiment of the present invention.

FIG. 8 is a representation of an example of a flow chart to assist in explaining a reclaim operation method of the data storage device 10 of FIG. 1, according to an embodiment of the present invention.

At step S210, the controller 100 may acquire a temperature information for a current temperature.

At step S220, the controller 100 may determine based on the temperature information that the current temperature is a normal temperature. In the case where the current temperature is an abnormal temperature (No), the process may proceed to the step S220. In the case where the current temperature is a normal temperature (Yes), the process may proceed to step S230.

At the step S230, the controller 100 may reclaim data stored in a memory unit corresponding to a position information included in the management list 110.

Figure 9:
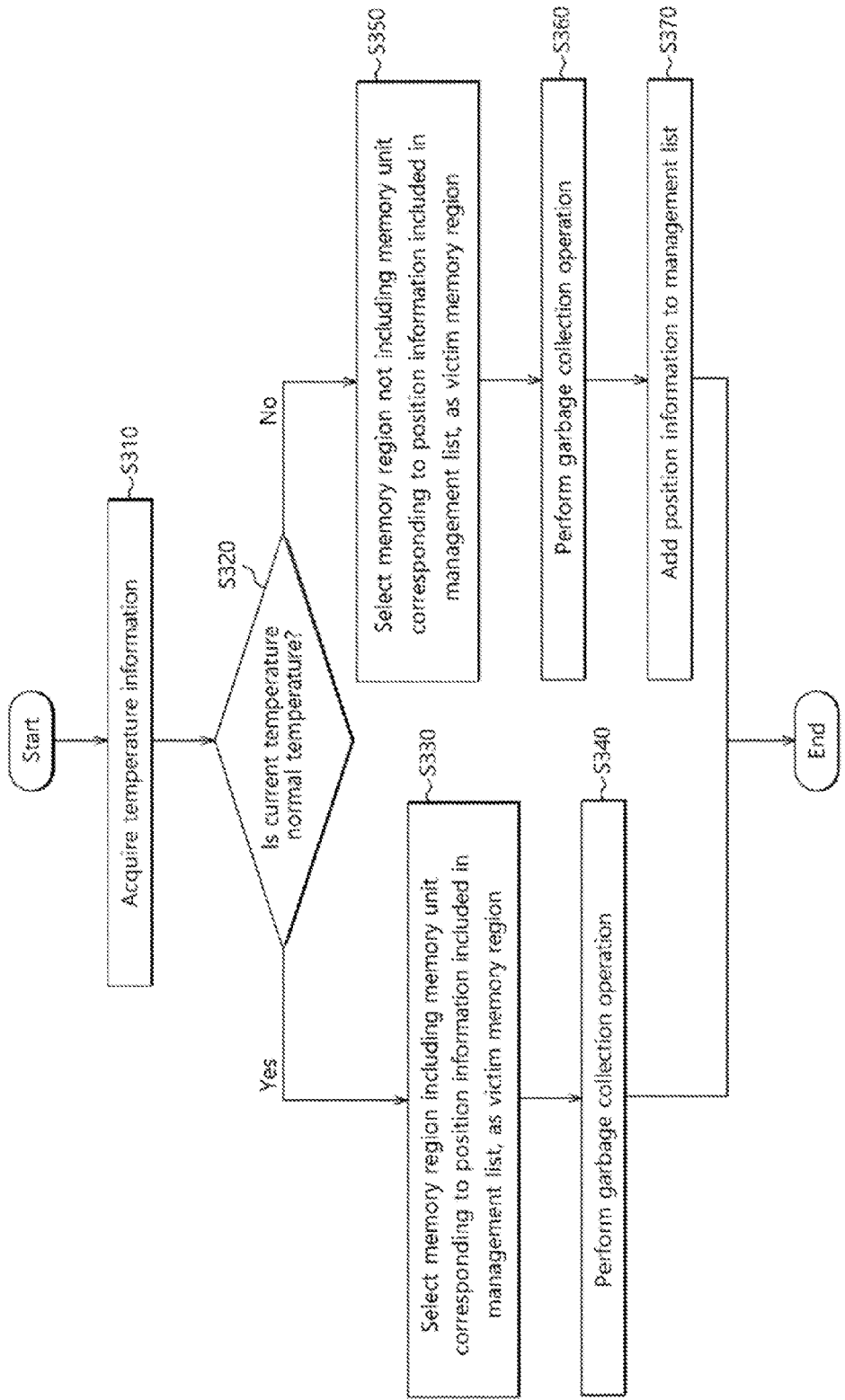
FIG. 9 is a flow chart of a garbage collection operation of the data storage device of FIG. 1 according to an embodiment of the present invention.

Referring to FIG. 9 a flow chart of a garbage collection operation method of the data storage device 10 of FIG. 1 is provided, according to an embodiment of the present invention.

At step S310, the controller 100 may acquire a temperature information for a current temperature.

At step S320, the controller 100 may determine based on the temperature information that the current temperature is a normal temperature. In the case where the current temperature is a normal temperature (Yes), the process may proceed to step S330. In the case where the current temperature is an abnormal temperature (No), the process may proceed to the step S350.

At the step S330, the controller 100 may select a memory region which includes memory units corresponding to position information included in the management list 110, as a victim memory region. For example, the controller 100 may select a memory region having one or more data stored at abnormal temperatures, as a victim memory block. A memory region may be, for example, a memory block.

At step S340, the controller 100 may perform the garbage collection operation for the victim memory region. The controller 100 may immigrate valid data stored in the victim memory region, to a new memory region, and erase the victim memory region.

At the step S350, the controller 100 may select a memory region which does not include a memory unit corresponding to a position information included in the management list 110, as a victim memory region. For example, the controller 100 may select a memory region having data stored at only normal temperatures, as a victim memory block.

At step S360, the controller 100 may perform the garbage collection operation for the victim memory region. The controller 100 may immigrate valid data stored in the victim memory region, to a new memory region, and erase the victim memory region.

At step S370, the controller 100 may add, to the management list 110, position information of memory units to which the valid data are immigrated from the victim memory region.

Figure 10:
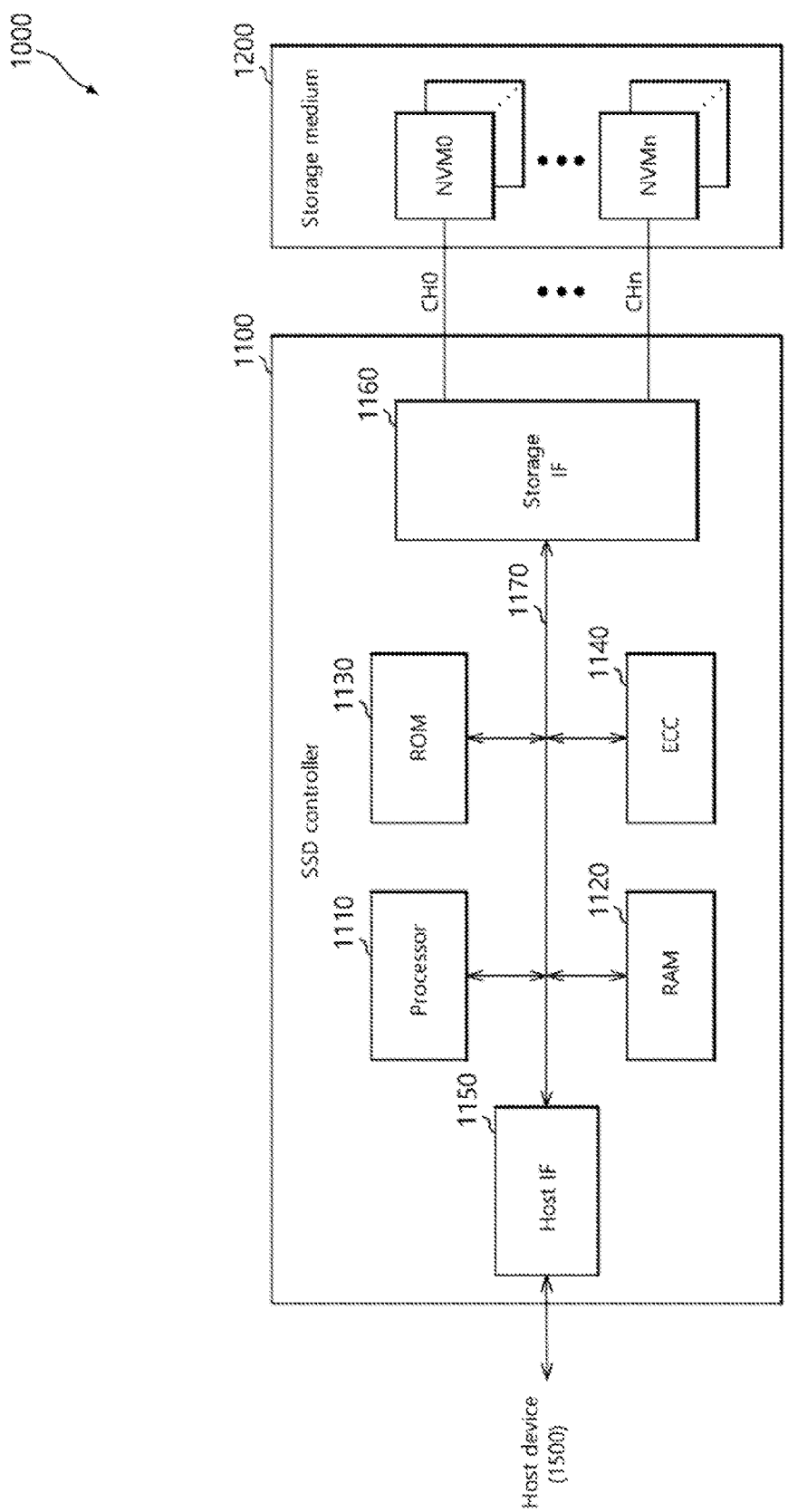
FIG. 10 is a block diagram illustrating a solid state drive (SSD), according to an embodiment of the present invention.

FIG. 10 is a block diagram illustrating an example of a solid state drive (SSD) 1000, according to an embodiment of the present invention. The SSD 1000 may include a controller 1100 and a storage medium 1200.

The controller 1100 may control data exchange between a host device 1500 and the storage medium 1200. The controller 1100 may include a processor 1110, a RAM 1120, a ROM 1130, an ECC unit 1140, a host interface 1150, and a storage medium interface 1160.

The controller 1100 may operate in a manner substantially similar to the controller 100 shown in FIG. 1. The controller 1100 may reclaim data stored in the storage medium 1200, according to a change in an operating condition. The controller 1100 may store again data that have previously been stored at an abnormal temperature, at a normal temperature using a reclaim operation, thereby reducing a difference between a write temperature and a read temperature and decreasing an error rate.

The processor 1110 may control the general operations of the controller 1100. The processor 1110 may store data in the storage medium 1200 and read stored data from the storage medium 1200, in response to data processing requests from the host device 1500. In order to efficiently manage the storage medium 1200, the processor 1110 may control internal operations of the SSD 1000 such as a merge operation, a wear leveling operation, and so forth.

The RAM 1120 may store programs and program data to be used by the processor 1110. The RAM 1120 may temporarily store data transmitted from the host interface 1150 before transferring it to the storage medium 1200, and may temporarily store data transmitted from the storage medium 1200 before transferring it to the host device 1500.

The ROM 1130 may store program codes to be read by the processor 1110. The program codes may include commands to be processed by the processor 1110, in order for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface 1150 may exchange data processing requests data etc, with the host device 1500.

The storage medium interface 1160 may transmit control signals and data to the storage medium 1200. The storage medium interface 1160 may receive data from the storage medium 1200. The storage medium interface 1160 may be coupled with the storage medium 1200 through a plurality of channels CH0 to CHn, The storage medium 1200 may include a plurality of nonvolatile memory devices NVM0 to NVMn. Each of the plurality of nonvolatile memory devices NVM0 to NVMn may perform write and read operations under the control of the controller 1100. Each of the plurality of nonvolatile memory devices NVM0 to NVMn may be configured in a manner substantially the same as the nonvolatile memory device 200 shown in FIG. 1.

Figure 11:
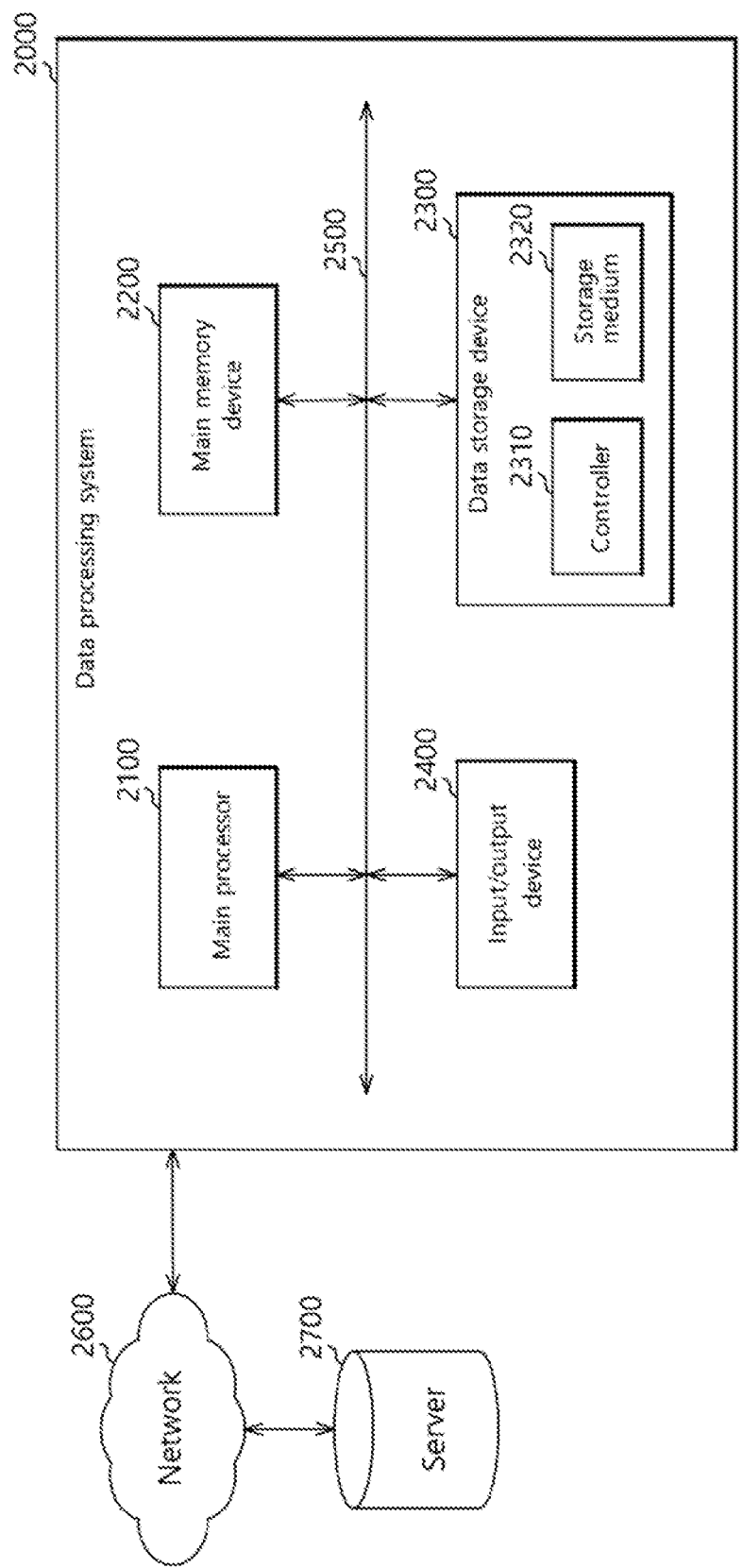
FIG. 11 is a block diagram illustrating a data processing, according to an embodiment of the present invention.

FIG. 11 is a block diagram illustrating a data processing system 2000 including a data storage device 10 of FIG. 1, according to an embodiment of the present invention.

The data processing system 2000 may include a computer, a laptop, a netbook, a smart phone, a digital TV, a digital camera, a navigator, etc. The data processing system 2000 may include a main processor 2100, a main memory device 2200, a data storage device 2300, an input/output device 2400, and or the like. The internal units of the data processing system 2000 may exchange data, control signals, etc. via a system bus 2500.

The main processor 2100 may control the general operations of the data processing system 2000. The main processor 2100 may be, for example, a central processing unit such as a microprocessor. The main processor 2100 may execute software processes such as an operation system, an application, a device driver, and so forth, on the main memory device 2200.

The main memory device 2200 may store programs and program data to be used by the main processor 2100. The main memory device 2200 may temporarily store data to be transmitted to the data storage device 2300 and the input/output device 2400.

The data storage device 2300 may include a memory controller 2310 and a storage medium 2320. The data storage device 2300 may be configured and operate in a manner substantially similar to the data storage device 10 shown in FIG. 1.

The input/output device 2400 may include a keyboard, a scanner, a touch screen, a mouse, a monitor screen and a GPIO (general purpose input/output), capable of exchanging data with a user, such as receiving a command for controlling the data processing system 2000 from the user or providing a processed result to the user.

According to an embodiment of the present invention, the data processing system 2000 may communicate with at least one server 2700 via a network 2600 such as a LAN (local area network), a WAN (wide area network), a wireless network, and so on. The data processing system 2000 may include a network interface unit (not shown) to access the network 2600.

While various embodiments have been described above, it will be understood by those skilled in the art that the described embodiments are examples only and are not intended to limit the, invention. Accordingly, the invention, including a data storage device and an operating method thereof as described herein should not be, limited based on the described embodiments. It is noted that many other embodiments and/or variations thereof may be envisaged by those skilled in the relevant art without departing from the spirit and or scope of the invention as defined in the following claims.

What is claimed is:

1. A data storage device comprising:
a nonvolatile memory device including a plurality of memory units; and
a controller suitable for acquiring temperature information for a current temperature when storing data in a memory unit, and for selectively adding position information of the memory unit to a management list when it is determined based on the temperature information that the current temperature is an abnormal temperature,
wherein the management list includes position information of one or more memory units on which write operations are performed at the abnormal temperature, and
wherein the controller reclaims the data stored in the memory unit corresponding to the position information included in the management list, when it is determined based on the temperature information that the current temperature is a normal temperature.

2. The data storage device according to claim 1, wherein the controller selectively reclaims data stored in a memory unit corresponding to position information included in the management list, according to the temperature information.

3. The data storage device according to claim 1,
wherein the nonvolatile memory device includes a plurality of memory regions each of which includes a plurality of memory units, and wherein the controller performs a garbage collection operation for a victim memory region selected according to the temperature information, and selectively adds position information of a memory unit to which valid data is immigrated from the victim memory region, to the management list, according to the temperature information.

4. The data storage device according to claim 3, wherein the controller selects a memory region which includes a memory unit corresponding to position information included in the management list, as the victim memory region, when it is determined based on the temperature information that the current temperature is a normal temperature.

5. The data storage device according to claim 3, wherein the controller selects a memory region which does not include a memory unit corresponding to position information included in the management list, as the victim memory region, when it is determined based on the temperature information that the current temperature is the abnormal temperature.

6. A method for operating a data storage device, comprising:
acquiring temperature information for a current temperature when storing data in a memory unit; and
selectively adding position information of the memory unit, to a management list when it is determined based on the temperature information that the current temperature is an abnormal temperature,
wherein the management list includes position information of one or more memory units on which write operations are performed at the abnormal temperature, and
wherein the data stored in the memory unit corresponding to the position information included in the management list is reclaimed when the current temperature is a normal temperature.

7. The method according to claim 6, further comprising:
selectively reclaiming data stored in a memory unit corresponding to position information included in the management list, according to the temperature information.

8. The method according to claim 6, further comprising:
selecting a victim memory region according to the temperature information;
performing a garbage collection operation for the victim memory region; and
selectively adding position information of a memory unit to which valid data is transferred from the victim memory region through the garbage collection operation, to the management list, according to the temperature information.

9. The method according to claim 8, wherein the selecting of the victim memory region comprises:
selecting a memory region which includes a memory unit corresponding to position information included in the management list, as the victim memory region, when the current temperature is a normal temperature.

10. The method according to claim 8, wherein the selecting of the victim memory region comprises:
selecting a memory region which does not include a memory unit corresponding to position information included in the management list, as the victim memory region, when the current temperature is the abnormal temperature.

11. A data storage device comprising:
a nonvolatile memory device; and
a controller suitable for reclaiming data which is stored in the nonvolatile memory device at an abnormal temperature,
wherein the controller waits instead of the reclaiming of the data when a current temperature is the abnormal temperature, and
wherein the controller adds position information corresponding to the data, to a management list when storing the data in the nonvolatile memory device.

12. The data storage device according to claim 11, wherein the controller reclaims the data when the current temperature is a normal temperature.

13. The data storage device according to claim 11, wherein, when performing a garbage collection operation, the controller determines whether the current temperature is a normal temperature, and selects a victim memory region for which the garbage collection operation is to be performed, based on position information included in the management list, according to a determination result.

14. The data storage device according to claim 11, wherein the management list includes position information of one or more memory units on which write operations are performed at the abnormal temperature.

* * * * *